J. SEGONDY.
Meat Cutter for Sausages.
No. 57,197.
Patented Aug. 14, 1866.
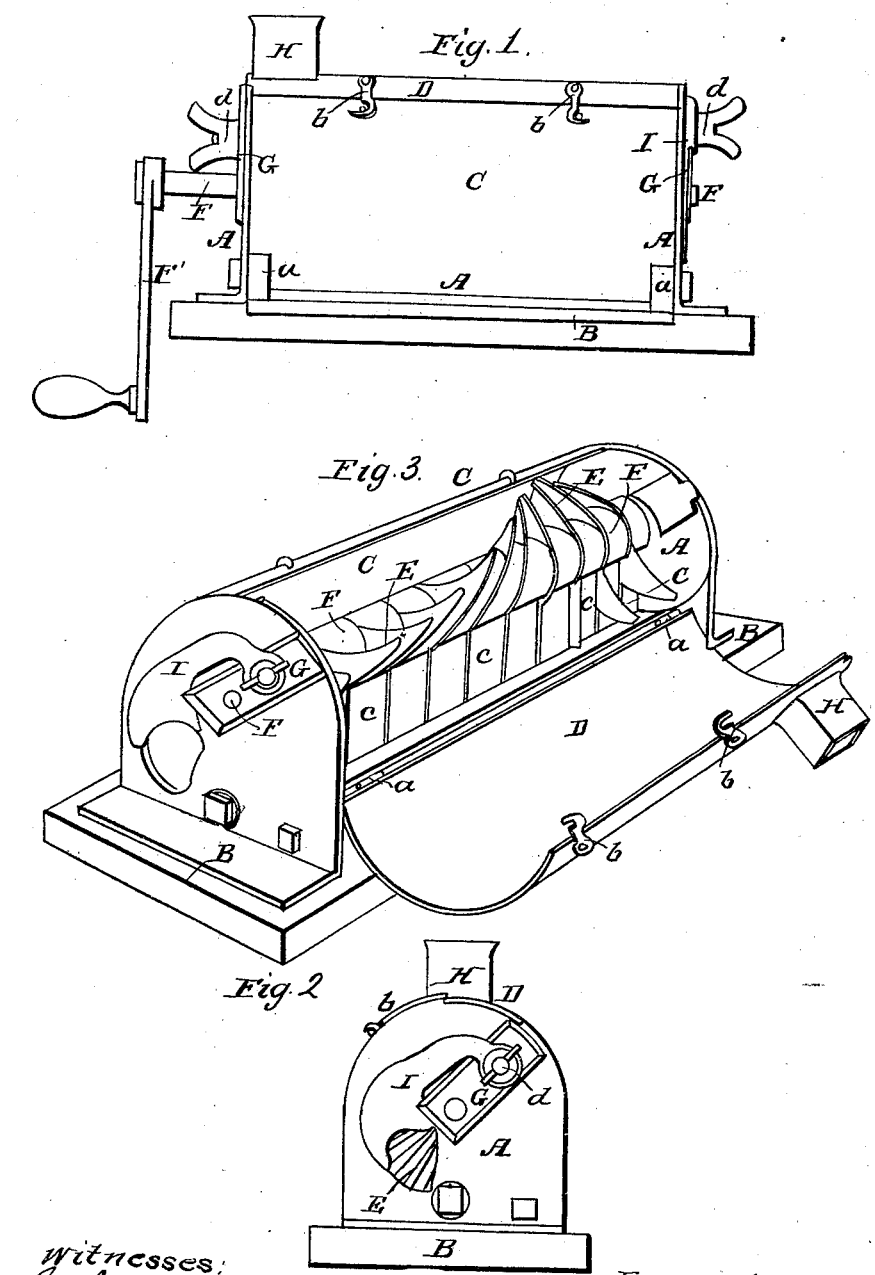

UNITED STATES PATENT OFFICE.

JEAN SEGONDY, OF ST. LOUIS, MISSOURI.

MEAT-CUTTER FOR SAUSAGES.

Specification forming part of Letters Patent No. 57,197, dated August 14, 1866; antedated July 31, 1866.

*To all whom it may concern:*

Be it known that I, JEAN SEGONDY, of the city and county of St. Louis, and State of Missouri, have invented a new and useful Machine for Cutting Sausage and other like Meats; and I do hereby declare that the following is a full and exact description thereof, reference being had to the accompanying drawings and to the letters of reference marked thereon.

Figure 1 of the annexed drawings is a side elevation of one of the improved machines. Fig. 2 is an end elevation of the same. Fig. 3 is a perspective view of it, showing one of the top doors of the casing thrown open for the purpose of disclosing the internal arrangements.

The nature of this invention consists in the peculiar mode of arranging the well-known cutters (which are in common use on like machines) in the inclosing-case, and in the application thereto of various devices for regulating the degree of fineness to which it is desired to reduce the cut meat.

To enable those skilled in the art to make and use my machine, I will proceed to describe its construction and operation.

A is a metallic frame, which consists of a bottom and two end pieces, all of which may be cast in one solid piece, or it may be formed of several pieces, and in either case it is to be fastened firmly to the base B. C and D are two convex doors provided with hooks $a$ on their lower edges, by means of which they are attached to the bottom piece of the frame A.

When the doors C D are in place their upper edges may be held together by means of the hooks $b$, and in this position they, with the frame A, will form an inclosing-case for the rotary cutters E, which are arranged spirally around the journal F, which finds its bearings in the end pieces of the frame A. A prolongation of the journal F, outside of one of the end pieces of the frame A, receives a crank, F', by means of which the cutters are turned around. A series of posts, $c$, are erected on the bottom portion of the frame A, from which they extend upward nearly to the journal F.

The posts $c$ should be placed so close together that the cutters E will have just sufficient room to pass between them. There are diagonal slots cut in each of the end pieces of the frame A, into which the sliding head-blocks G are fitted, and where they may be secured by the set-screws $d$.

An opening is made through one end of the door D, and surrounded with a hopper, H, for the introduction of the meat to be cut. An opening is made for the emission of the cut meat in the opposite end of the case in one of the pieces of the frame A, near its lower end.

The size of the last-named orifice may be regulated by means of the slide I, one end of which is embraced under the set-screw $d$ on that end.

The slide I may be set to make the opening for the meat-exit of any required size, and when set to its proper place held fast by the screw $d$. By setting the slide I so as to cover more or less of the said opening the meat will have a more or less free exit from the machine, and consequently can be retained in the case, subject to the action of the cutters, a longer or shorter time, as may be required to cut the meat to any degree of fineness required. This is an improved mode of adjusting the cutting operation, and is one principal point in this invention.

The meat will be fed in through the hopper H to the knives or cutters F, which, being arranged spirally around their journal, will force the meat to the opposite end, where it will find its exit. At each revolution of the cutters they will force the meat against the posts $c$, and so cut it. There is not anything new in this part of the machine; but it is claimed to be a decided improvement in these machines to have the inclosing-case formed partly of the doors C D, as already described, so they may be unhooked and taken off for the purpose of washing the machine.

Having described my invention, what I claim is—

The sliding head-blocks G and the slide I, when constructed and employed as and for the purpose set forth.

JEAN SEGONDY.

Witnesses:
M. RANDOLPH,
A. WAGNER.